(12) United States Patent
Speas

(10) Patent No.: US 11,457,552 B2
(45) Date of Patent: Oct. 4, 2022

(54) TOPOGRAPHY FOLLOWING MATERIAL COLLECTION DEVICE AND RELATED METHODS THEREOF

(71) Applicant: Dwight David Speas, Spring Lake, NC (US)

(72) Inventor: Dwight David Speas, Spring Lake, NC (US)

( * ) Notice: Subject to any disclaimer, the term of this patent is extended or adjusted under 35 U.S.C. 154(b) by 460 days.

(21) Appl. No.: 16/363,633

(22) Filed: Mar. 25, 2019

(65) Prior Publication Data

US 2020/0305332 A1  Oct. 1, 2020

(51) Int. Cl.
 *A01B 43/00* (2006.01)

(52) U.S. Cl.
 CPC ................ *A01B 43/00* (2013.01)

(58) Field of Classification Search
 CPC ....... A01B 43/00; A01B 43/005; A01B 13/00; A01B 21/04; A01B 21/06; A01B 19/00; A01B 19/02; A01B 19/08; A01B 23/02; A01B 25/00; A01B 33/04; A01B 35/00; A01B 35/02; A01G 20/43; A01D 51/00; A01D 76/00; A01D 76/006
 See application file for complete search history.

(56) References Cited

U.S. PATENT DOCUMENTS

| 2,102,100 A | * | 12/1937 | Skarphol | A01D 76/006 56/375 |
| 10,064,321 B2 | * | 9/2018 | Zemenchik | A01B 73/044 |

FOREIGN PATENT DOCUMENTS

| CN | 105659952 A | * | 6/2016 |
| CN | 107484443 A | * | 12/2017 |
| CN | 107996041 A | * | 5/2018 |
| CN | 108076695 A | * | 5/2018 |
| CN | 108834448 A | * | 11/2018 |
| CN | 109220011 A | * | 1/2019 |

* cited by examiner

*Primary Examiner* — Adam J Behrens
(74) *Attorney, Agent, or Firm* — Olive Law Group, PLLC

(57) ABSTRACT

A topography following material collection device and related methods thereof are disclosed. According to an aspect, The device comprises a topography following system, a material collecting system, a plurality of ground contacting implements, where the topography following system provides support for the material collecting system at a desired height with respect to a ground surface, and the material collection system supporting the ground contacting implements in supplemental and augmenting stages, such that the device is adapted to be moved over ground with laterally-stable progress while following topography of the ground to collect material from the ground.

12 Claims, 7 Drawing Sheets

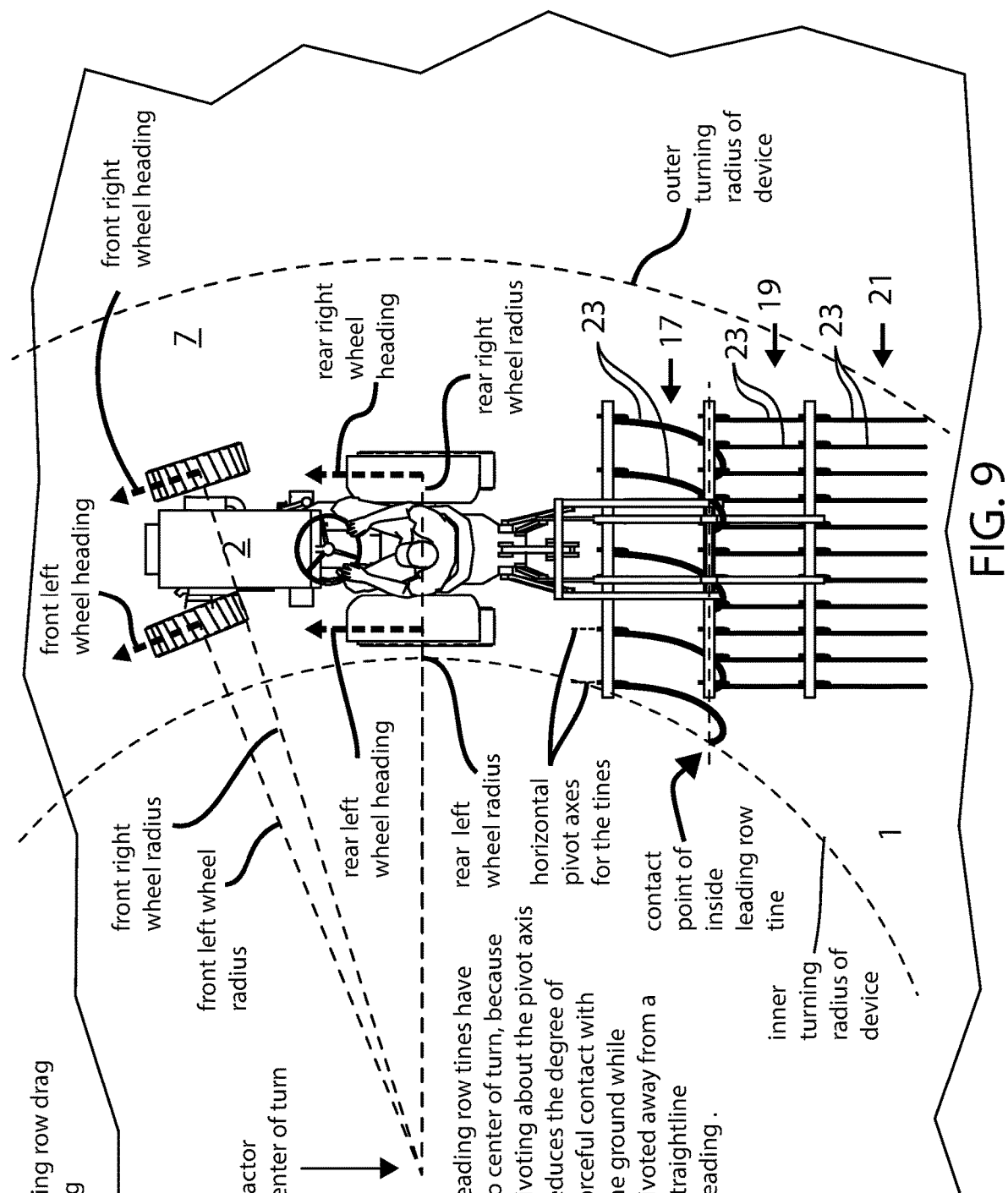

TOPOGRAPHY FOLLOWING MATERIAL COLLECTION DEVICE AND RELATED METHODS THEREOF

TECHNICAL FIELD

The presently disclosed subject matter relates generally to ground-material-collecting implements, and more specifically, rakes and ground working equipment for attachment to vehicles and agricultural and off-road vehicles.

BACKGROUND OF THE INVENTION

There have been several devices practiced to collect and pull material behind vehicles, for collection or ground working purposes. Some of these include landscape rakes, hay rakes, cultivators, tillers, seeders, Plows, and aerators, among others. When pulled with a vehicle or beast of burden, or even hand-powered implements, these devices have stability, maneuverability, capacity, or orientation limitations. It is a long felt need in the art for a solution which overcomes these limitations.

SUMMARY

The presently disclosed subject matter is a Topography Following Material Collection Device. According to an aspect, the device comprises a topography following system, a material collecting system, a plurality of ground contacting implements, where the topography following system provides support for the material collecting system at a desired height with respect to a ground surface, and the material collection system supporting the ground contacting implements in supplemental and augmenting stages, such that the device is adapted to be moved over ground with laterally-stable progress while following topography of the ground to collect material from the ground.

In a contemplated embodiment, wherein the topography following system comprises a pivot and an orientation linkage pivotably supported at the pivot, and the ground contacting implements comprise leveraged collection implements, leveraged collection implements being collection implements supported by the orientation linkage that are arranged to apply force normally through the orientation linkage to the ground, proximate to the location on the ground that is aligned with the pivot.

In one example of such an embodiment, the topography following system comprises a location linkage, the pivot being located on the location linkage such that the orientation linkage is pivotably supported at the pivot by being pivotably supported with respect to the location linkage. The location linkage is adapted to locate the orientation as to its height with respect to the ground.

In at least one other embodiment, the stages follow the ground successively and pivotably align the collection system with the ground with passive deflection of the topography following system.

In one of such embodiments, the device is supported by a vehicle moving over the ground and passive deflection of the topography following system comprises vertical deflections of the vehicle by the topography.

In another embodiment, the stages follow the ground successively and pivotably align the collection system with the ground with active deflection of the topography following system. In at least one example of such an embodiment, the device is supported by a vehicle moving over the ground, and the topography following system is adapted to adjustment to a desired height, and active deflection of the topography following system comprises adjustment with respect to the vehicle while the vehicle is being moved over the ground.

In another embodiment, the ground contacting implements comprise a positive angle of attack, with respect to the ground.

In another embodiment, the collection system is arranged to provide anti-scatter geometry. One example of anti scatter geometry would be one in which material passing from a row of ground contacting implements to a stagewise succeeding row would prevent material from being split into different directions as it passes, or one in which the material is handled such that it accumulates and stays together, rather than being spread out or divided, even if the material remains in contact or tumbling or rolling contact with the ground.

In another embodiment, the ground contacting implements comprise leading and trailing implements, where a leading implement being a ground-contacting implement being adapted to collect material from the ground by being moved over ground, and a trailing implement being an implement which is adapted to be moved over ground over which a leading implement has previously moved, and is adapted to collect at least one of material which was not collected by a leading implement and material which was previously collected by a leading implement.

In another embodiment, each of the stages has a stage collection capacity and wherein each particular stage is adapted to continuous material collection after reaching the stage collection capacity for the particular stage.

In at least an example of such an embodiment, each stage is adapted to continuous collection of material after the reaching the stage capacity for the particular stage by delivering collected material to a successive stage after the particular stage reaches the stage capacity for the particular stage.

In at least one embodiment, wherein the device is adapted to laterally stable progress over the ground by comprising ground contacting implements which are pivotable laterally with respect to progress. In at least an example of such an embodiment, the ground contacting implements are pivotable laterally by being pivotable about an axis which is one of horizontal and parallel to the ground.

In at least one embodiment, the device is wheel-less.

In another embodiment, the device is assembled and arranged to provide supplemental and augmenting stages of collection by each of the stages comprising at least one row of the ground contacting implements, and is adapted to collect material from the ground by being moved over ground by arranging the stages to successively progress over the ground. At least one stage of such an embodiment is a lifting stage, a leading stage being one which is adapted to lift material by lifting material from the ground.

In another embodiment, the material collected comprises one selected from a list comprising foliage, coniferous foliage, pine needles, coniferous needles, tree branches, tree-deposited ground material, forest floor material, packed ground material, compressed forest floor material, layered ground material, leaves, deciduous material, and plant material deposited onto the ground.

In another embodiment, the device is adapted to lateral stability by the device being moved over the ground by a vehicle having a vehicle width, and each of the stages having a stage width, wherein the stage widths are no greater than approximately the vehicle width.

BRIEF DESCRIPTION OF THE DRAWINGS IN THE FIGURES

FIG. 9 is a plan view of an exemplary topography following material collection device, shown being moved over ground in a collection path through a turn.

DETAILED DESCRIPTION

Figure 1:
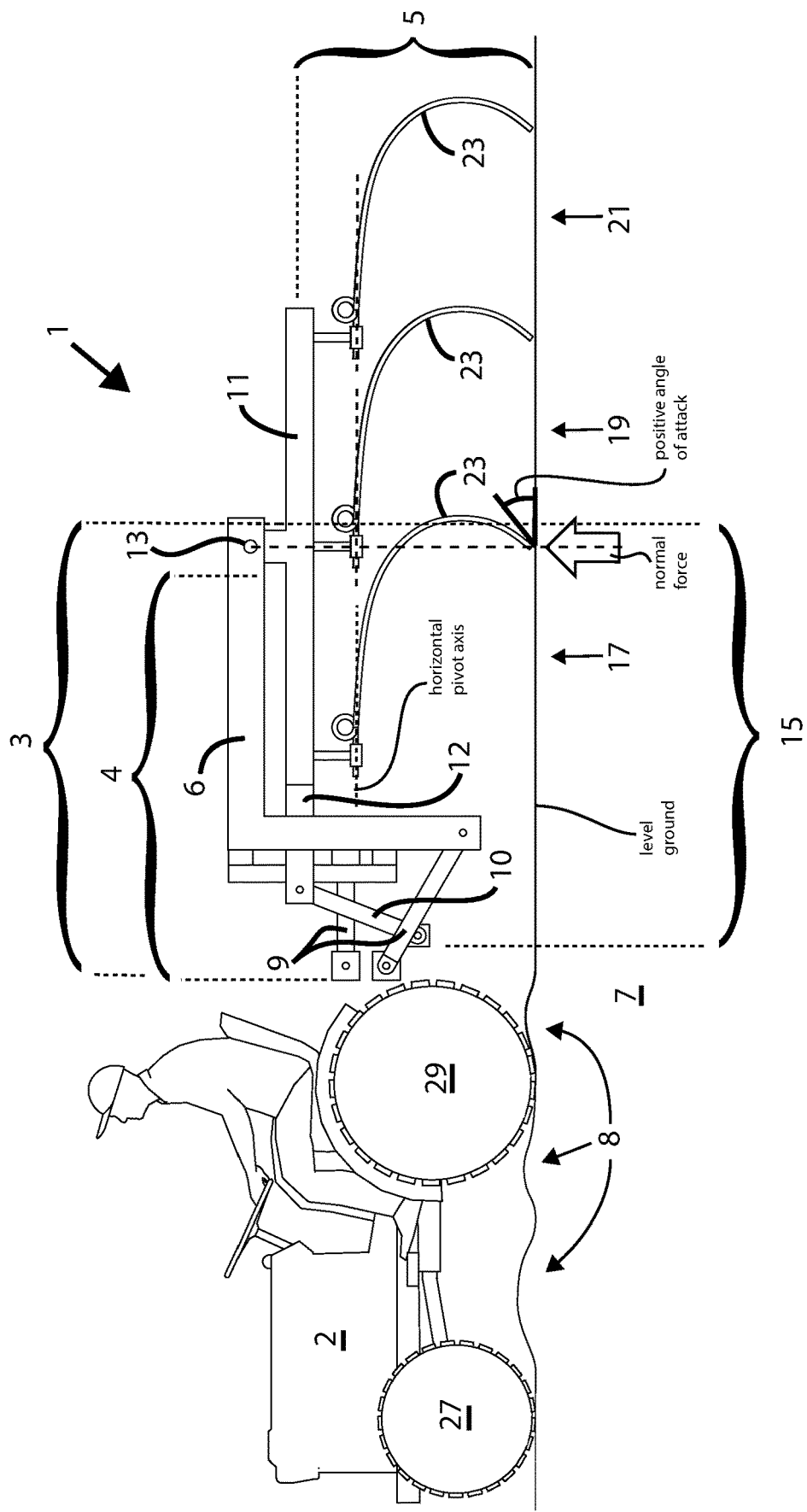
FIG. 1 is a side elevation view of an exemplary topography following material collection device.

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Articles "a" and "an" are used herein to refer to one or to more than one (i.e. at least one) of the grammatical object of the article. By way of example, "an element" means at least one element and can include more than one element.

"About" is used to provide flexibility to a numerical endpoint by providing that a given value may be "slightly above" or "slightly below" the endpoint without affecting the desired result.

The use herein of the terms "including," "comprising," or "having," and variations thereof is meant to encompass the elements listed thereafter and equivalents thereof as well as additional elements. Embodiments recited as "including," "comprising," or "having" certain elements are also contemplated as "consisting essentially of" and "consisting" of those certain elements.

Recitation of ranges of values herein are merely intended to serve as a shorthand method of referring individually to each separate value falling within the range, unless otherwise indicated herein, and each separate value is incorporated into the specification as if it were individually recited herein. For example, if a range is stated as between 1%-50%, it is intended that values such as between 2%-40%, 10%-30%, or 1%-3%, etc. are expressly enumerated in this specification. These are only examples of what is specifically intended, and all possible combinations of numerical values between and including the lowest value and the highest value enumerated are to be considered to be expressly stated in this disclosure.

Unless otherwise defined, all technical terms used herein have the same meaning as commonly understood by one of ordinary skill in the art to which this disclosure belongs.

The described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

While the embodiments have been described in connection with the various embodiments of the various figures, it is to be understood that other similar embodiments may be used, or modifications and additions may be made to the described embodiment for performing the same function without deviating therefrom. Therefore, the disclosed embodiments should not be limited to any single embodiment, but rather should be construed in breadth and scope in accordance with the appended claims.

The following is a list of several terms having reference numbers, which appear in the FIGS.
1. Topography following material collection device.
2. Vehicle or tractor, as specified.
3. Topography following system
4. Location linkage
5. Material collection system
6. Chassis
7. Ground
8. Topography
9. Linkage/multi bar linkage
10. Frame link
11. Frame
12. Frame lever arm
13. Pivot
15. Orientation linkage
17. Leading row
19. First trailing row
21. Second trailing row
23. Ground contacting implements/collection tines/arcuate tines
25. Material/collectible material/ground material/collected material, as specified contextually
27. Front wheels of the tractor
29. Rear wheels of the tractor Referring now to FIG. 1, an exemplary embodiment of a device embodiment of the present invention 1 is shown in a side elevation view, supported by a tractor 2, standing on an area of ground 7. Here, the slope of the ground 7 is level, and the ground 7 has a topography 8 that is bumpy under the tractor 2, and is smooth under the device 1. The device 1 comprises a material collection system 5, and a topography following system 3.

The material collection system 5 comprises plural rows 17, 19, 21 of ground contacting implements 23 and a frame 11. Here, the ground contacting implements 23 are material collection tines 23. The stagewise successively proceeding rows comprise a leading row 17, a first trailing row 19, and a second trailing row 21. There are contemplated embodiments of collection systems which have a greater number of leading and trailing rows than the presently depicted embodiment.

Here, the tines 23 are each pendently supported from a frame 11 and are each angularly articulable about a respective horizontal axis. Here, the horizontal axes are parallel to the length of the frame 11, and the tines 23 are angularly articulable in a plane transversely arranged to the length of the frame 11. The material collection tines 23 are arcuate in shape, such that they extend rearwardly from an upper connection with the frame 11 at the horizontal axis, and then curve downward and forward, until engaging the ground 7 as ground-contacting implements that have a positive angle of attack, with respect to the surface of the topography 8 of the ground 7.

The topography following system 3 comprises a location linkage 4, and an orientation linkage 15.

The location linkage 4 comprises a chassis 6, and a multi bar linkage 9.

The orientation linkage 15 comprises a frame link 10 and a frame lever arm 12.

The material collection system 5 is located at a desired height by the location linkage 4 by the frame 11 being pivotably supported at a pivot 13 on the chassis 6. The material collection system 5 is oriented at a desired slope and angular orientation with respect to the ground 7 by the orientation linkage 15 by the lever arm 12 being rigidly affixed to the forward end of the frame 11, and thereby providing an extended radius of rotation, with respect to the pivot 13. In this arrangement, the frame link 10 effects a desired orientation to the frame 11, with respect to the tractor 2, in coordination with the multi bar linkage 9 of the location linkage 4.

It will become noteworthy in the exemplary embodiments shown in FIGS. 2-7 that the quality of the contact of the leading and trailing rows differs. The orientation system 15 and leading row 17 are arranged such that the tines 23 of the leading row 17 contact the ground 7 with leveraged contact on level ground, or while the frame 11 is arranged substantially parallel to the slope of the topography 8 of the ground 7.

Leveraged contact means a degree of forceful contact applied normally (approximately perpendicular) to the slope of the ground 7, at the site at which the tines 23 of the leading row 17 contact the ground 7, such that the force of the location linkage 4 passes directly to the ground 7, in alignment with a line extending from the pivot 13 to the site of contact (of the tines 23 of the leading row 17) with the ground 7.

Skimming contact means a level of forceful contact which is significantly less than that of leveraged contact. Here, the trailing rows 19 and 21 contract the ground 7 with skimming contact. Skimming contact prioritizes regularity of continuous contact, at any particular level of force being applied in a row having leveraged contact. The tines 23 of the trailing rows 19 and 21 remain in predominantly continuous contact with the ground 7, but do not consume a significant amount of the force imposed upon the frame 11 (at the pivot 13) by the location linkage 4.

Figure 2A:
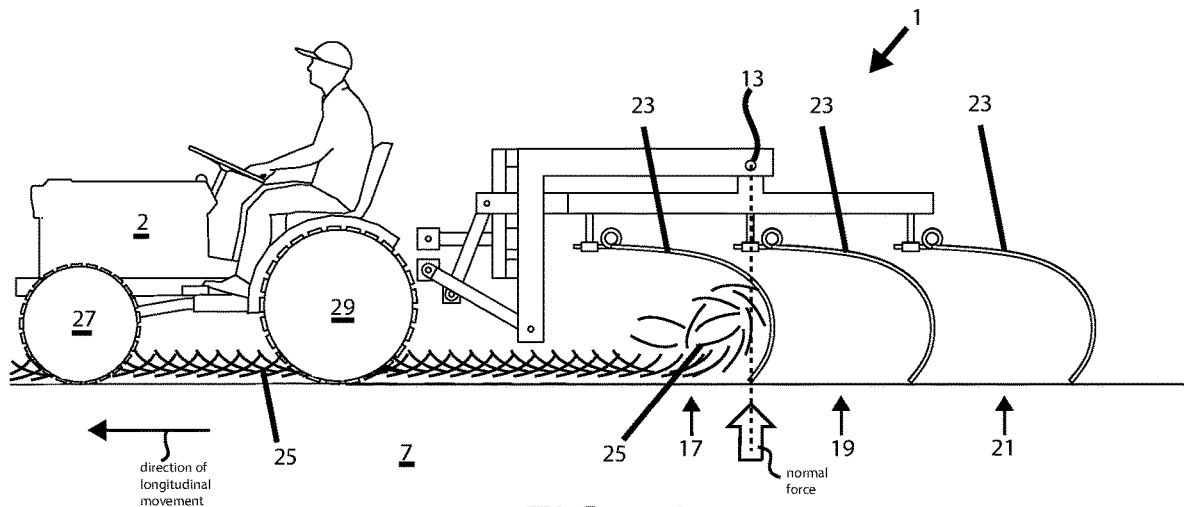
FIG. 2A is a side elevation view of an exemplary topography following material collection device having 3 rows of collection implements, with an accumulation of material in one row.
Figure 2B:
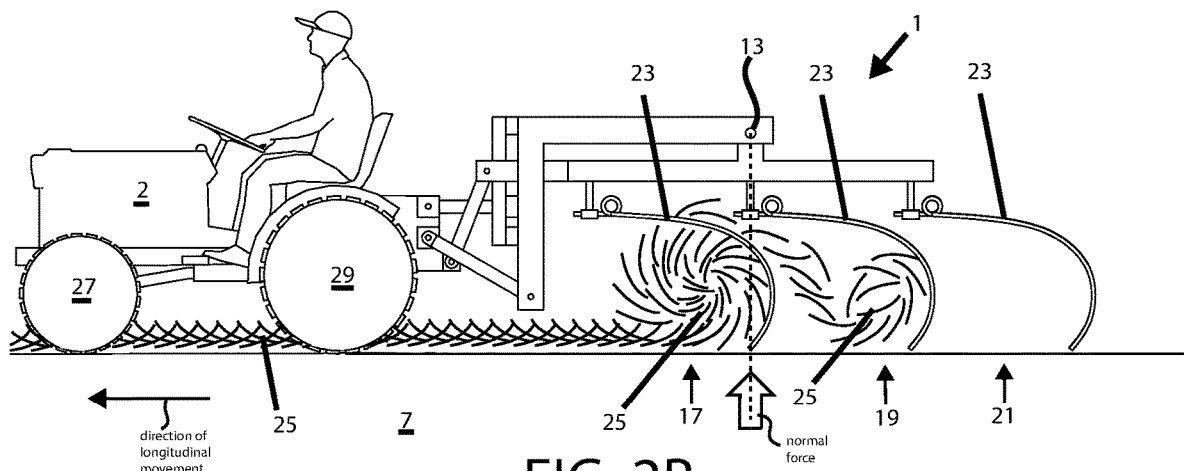
FIG. 2B is a side elevation view of an exemplary topography following material collection device having 3 rows of collection implements, with an accumulation of material in two rows.
Figure 2C:
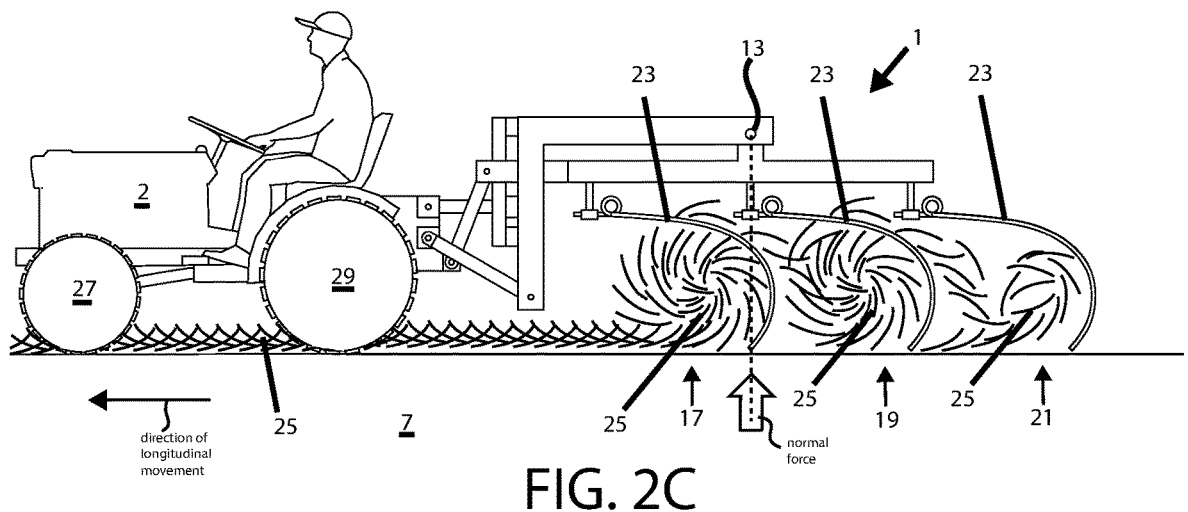
FIG. 2C is a side elevation view of an exemplary topography following material collection device having 3 rows of collection implements, with an accumulation of material in three rows.

Referring now to FIGS. 2A-C, what is shown is a material collection behavior of an exemplary embodiment of the present invention. Similarly to FIG. 1, a device 1 embodiment is shown supported by a tractor 2 that is moving over an area of ground 7 having predominantly level topography under the device 1. The ground 7 is covered by a collectible fibrous material 25. Such a material may be similar, for example, to pine needles or small branch debris or cuttings from long grass. The device 1 has been moved longitudinally over the ground 7, such that the material 25 is collecting in the several stagewise successive rows (leading row 17 and trailing rows 19 and 21).

Referring now to FIG. 2A, what is shown is the device 1 collecting material 25 from the ground 7 during an initial amount of a distance over which to collect material 25. Material is collecting in the leading row 17, while the trailing rows 19, 21 have not yet accumulated any of the material 25. The amount of material 25 is less than a maximum row capacity for material 25, for the tines 23 of the leading row 17.

Referring now to FIG. 2B, the leading row 17 has reached a collection capacity at which it has begun to deliver the collected material 25 to the first of the trailing rows 19. Here, the mode of delivery is where the material 25 rises to the top of the tines 23, and overspills the top of the tines 23, to the successively stagewise following row (here, trailing row 19). The tines 23 have been selected and sized such that the collected material 25 does not exit the leading row until the leading row 17 has reached its peak capacity, and the material 25 overspills the leading row 17, and thereby is delivered into the immediately successive row (here, trailing row 19).

Referring now to FIG. 2C, what is shown is that the leading row 17 is continuing to collect material 25, and continues to deliver material 25 to the trailing row 19 immediately succeeding it, as the device 1 is moved over the ground 7. The second row (trailing row 19) has reached its collection capacity at which material 25 begins to overspill the tines 23, and is now delivering to its immediately stagewise succeeding trailing row (trailing row 21), as the device 1 is moved over the ground 7.

Here, the trailing row 21 is arranged at a height and quality of contact with the ground such that it also collects material 25 from the ground, that material 25 having been partially loosened by the first row 17, as well as material 25 which becomes collected in the trailing row 19 by the material 25 in the trailing row 19 tumbling over and drawing such collected first trailing row (19) material from the surface 25 into its own collected material.

Depending upon the quality of contact with the ground 7, the preceding row (trailing row 19) may also collect material 25 from the ground 7, but in the specific embodiments shown in FIGS. 1-6, the leading row is in a leveraged contact with the ground, while the trailing rows are arranged in skimming contact with the ground. The leveraged contact is more forceful than that of skimming contact, and the first trailing row 19 is therefore shown to be collecting only material which overspills the leading row 17. The skimming contact of the first trailing row 19 may be enough, in otherwise similar embodiments, that material 25 would be unlikely to escape the trailing row 19. Here, though, it is shown as escaping the row 19 into the second collecting row 21 to emphasize the difference in contact force between the leading row 17 and trailing row 19.

At this point, the third row (second trailing row 21), begins to collect material 25 in the same way as the preceding rows (leading row 17 and trailing row 19), until it reaches its own capacity.

Note that there is no limitation of the present embodiment as to that would require all contemplated embodiments to have particularly three rows, or even that they would be strictly in series with one another. It is also possible that rearrangement of these parts would provide active or default alternative heights and clearances of the second and third rows, and any with respect to rows in addition to these shown. It is also contemplated that the third row (second trailing row 21) would have additional features or a differently shaped upper geometry that material 25 collected would be limited against material escaping the tines 23 in the manner of the preceding rows 17, 19.

Figure 3:
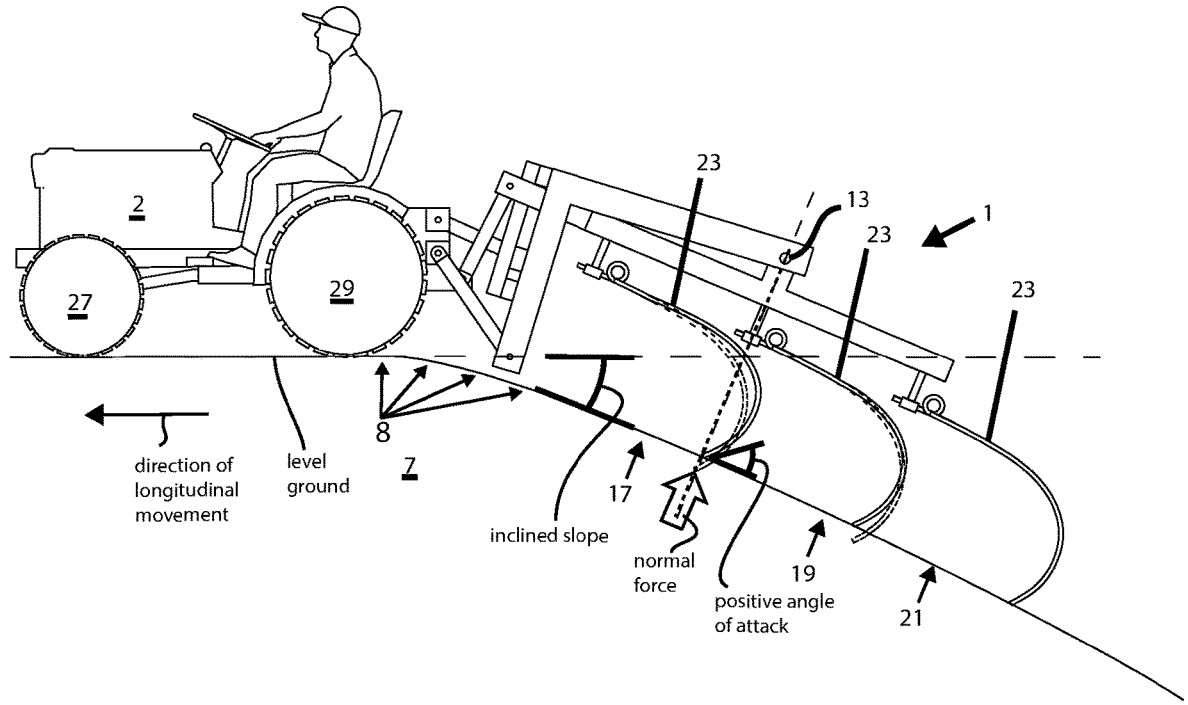
FIG. 3 is a side elevation view of an exemplary topography following material collection device having 3 rows of collection implements, in an orientation having an actively lowered location.

Referring now to FIG. 3, what is shown is a similar embodiment as shown in FIGS. 1 and 2A-C. The tractor 2 has reached a location of the topography 8 which transitions from a significantly inclined slope to level slope, while moving the device 1 over the ground 7. Here, the operator of the tractor 2 has actively adjusted the location linkage 4 of the topography-following system 3, such that it is moved to a lower height (relative to the ground 7 shown in FIGS. 1 and 2A-C, which were on level ground with zero slope) such that the pivot 13 is at a lower height.

In this lower position, the device 1 maintains the tines 23 of the rows 17, 19, 21 in contact with the ground by the orientation linkage 15 tracking the steep topography 8 of the very positive slope (relative to the level ground before and after the incline) and which is significantly negatively angularly offset relative to the instant plane (level ground) of the tractor 2.

By the operator articulating the multibar linkage 9 angularly downward, the chassis 6 descends and pivots forward, toward the tractor 2. Bringing the chassis 6 forward causes the pivot 13 to move toward the tractor 2, and thereby elevates the frame arm 12. These relative movements articulate the orientation linkage 15 upward dramatically. This increase in slope brings the tines 23 of the leading row 17 upward and the trailing rows 19, 21 downward, until the frame 11 and the tines 23 of all of the rows 17, 19, 21 attain a similar orientation to the inclined slope of the topography 8 as was available had when the device 1 was being moved over level ground (FIGS. 1 and 2A-C).

Not shown here, but which may be deduced from FIG. 3, is that in the case of cresting a hill, where the leading row 17 would contact the slope of the hill, but-for a bumpy topography 8 depression in the slope, the multibar linkage 9 would continue to articulate upward, until one or both of the trailing rows' (19 and 21) tines 23 came into contact with the hill. In this way, even where one of the rows comes away from the surface of the hill, the orientation linkage 15 ensures that no material 25 was lost from the collection system 5.

Figure 4:
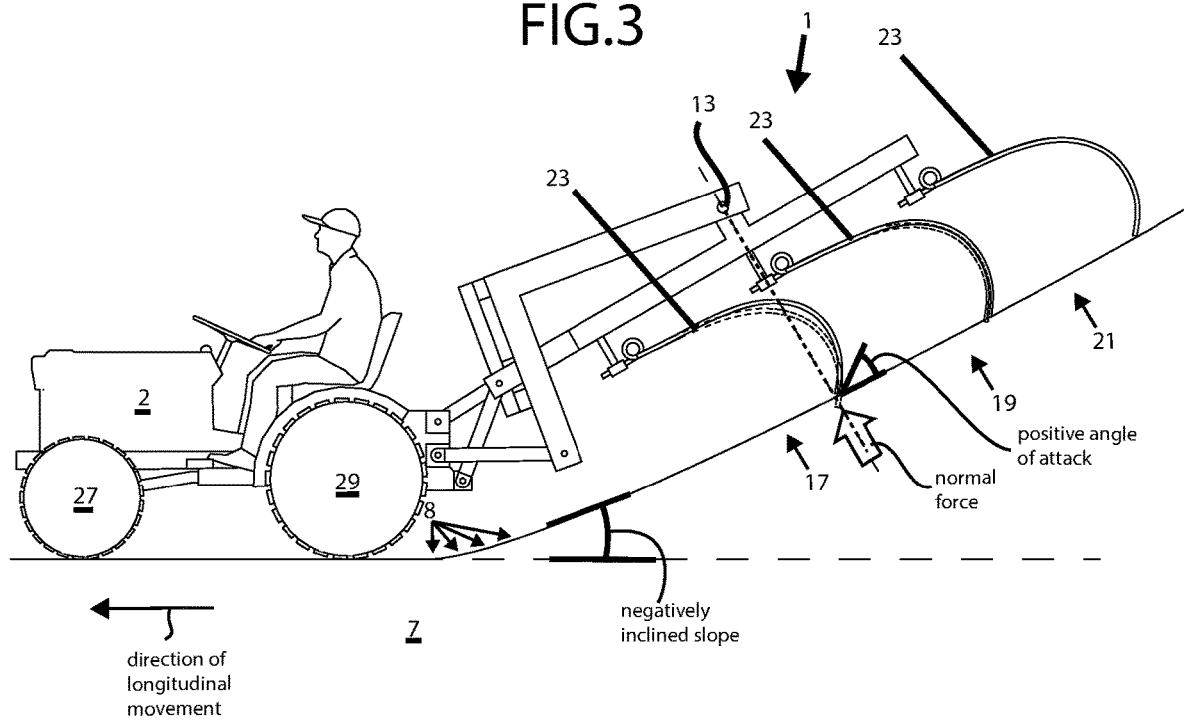
FIG. 4 is a side elevation view of an exemplary topography following material collection device having 3 rows of collection implements, in an orientation having an actively elevated location.

Referring now to FIG. 4, what is shown is the device 1 reaching the bottom of a negative incline, or otherwise similarly to the tractor 2 reaching a level slope area of ground 7 in a valley, while the device 1 reaches the bottom of a hill, at a positive angular offset to the instant plane (level ground) of the tractor 2.

Here, the operator of the tractor 2 has actively adjusted the location linkage 4 of the topography-following system 3 such that it is moved to a higher height (relative to the ground 7 shown in FIGS. 1 and 2A-C, which were on level ground with zero slope) such that the pivot 13 is at a higher height.

In this higher position, the device 1 maintains the tines 23 of the rows 17, 19, 21 in contact with the ground, by the orientation linkage 15 tracking the steep topography of the very negative slope (relative to the level ground before and after the negatively inclined ground 7) and which is significantly positively angularly offset relative to the instant plane of the tractor 2.

By the rider articulating the multibar linkage 9 angularly upward, the chassis 6 ascends and pivots rearward, away from the tractor 2. Moving the chassis 6 rearward causes the pivot 13 to move away from the tractor 2, and thereby lower the slope of the frame arm 12. These relative movements articulate the orientation linkage 15 downward dramatically. This decrease in slope brings the contact sites of the tines 23 of the leading row 17 downward and of the tines 23 of the trailing rows 19, 21 upward, until the frame 11 and the tines 23 of all of the rows 17, 19, 21 attain a similar orientation to the declined slope of the topography 8 as was available had when the device 1 was being moved over level ground (FIGS. 1 and 2A-C).

Figure 5:
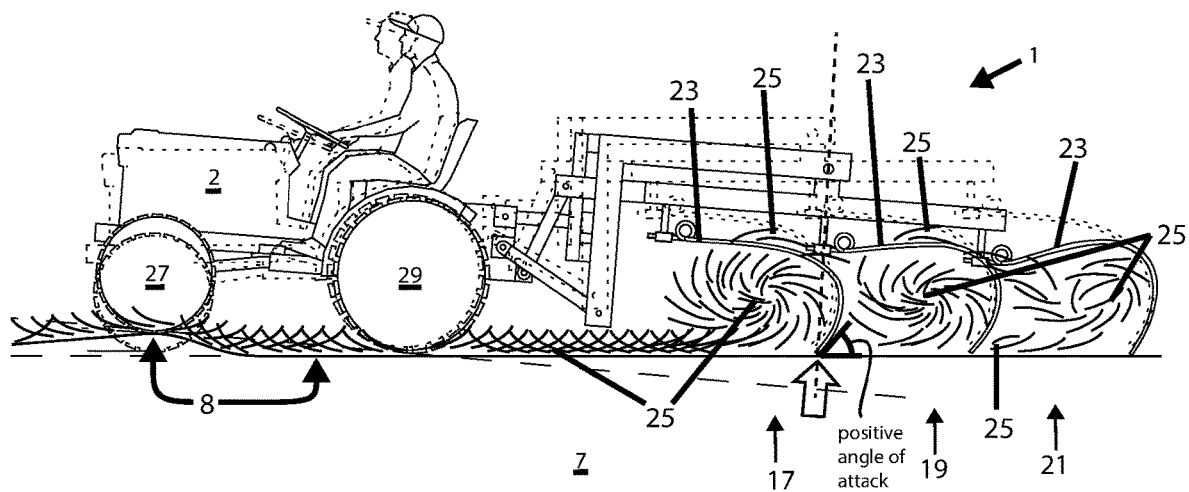
FIG. 5 is a side elevation view of an exemplary topography following material collection device having 3 rows of collection implements, in an orientation having a passively lowered location.
Figure 6:
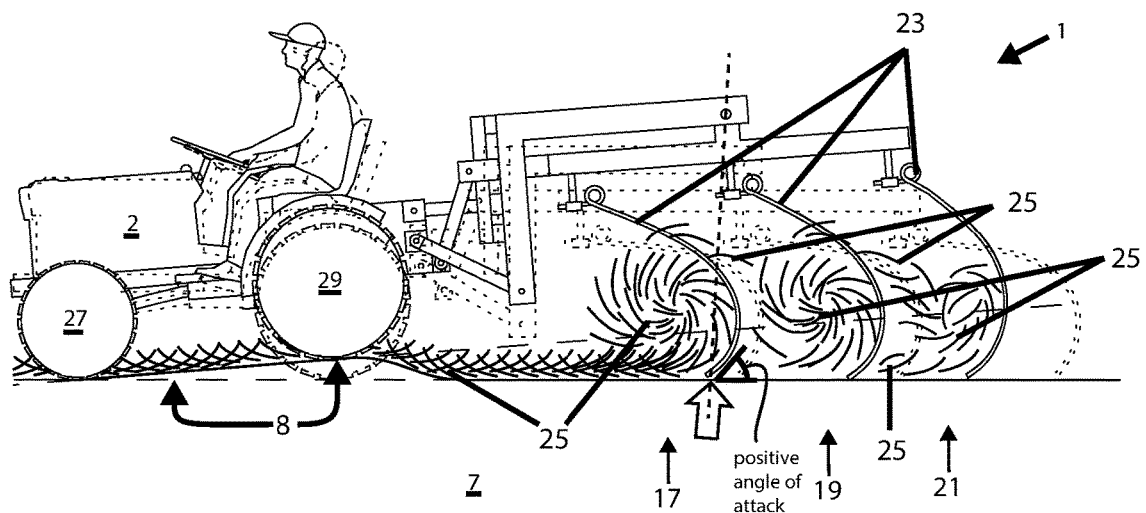
FIG. 6 is a side elevation view of an exemplary topography following material collection device having 3 rows of collection implements, in an orientation having a passively elevated location.

Referring now to FIGS. 5-6, what is shown is a side elevation view of an exemplary device 1 being moved over ground 7 having irregular topography 8, whereupon the tractor 2, riding on front 27 and rear 29 wheels, encounters bumps in the topography 8, such that the tractor 2 is sharply and briefly (forcefully) deflected to a positive incline (FIG. 5), and a negative incline (FIG. 6).

Referring now to FIG. 5, the tractor 2, moving the device 1 over ground 7 with predominantly level slope, encounters topography 8 which bumps the front wheel 27 of the tractor 2.

The front wheel bump has the effect of suddenly tipping rearward both the tractor 2 and device 1, about the rear wheels 29 of the tractor 2. The only components of the device 1 in forceful, leveraged contact with the ground 7, as the tractor 2 and device 1 are bumped, are the tines 23 of the leading row 17.

Therefore, despite the change in slope of the frame 11, the force path will continue to be routed to the ground 7 directly at the site at which only the tines 23 of the leading row 17 contact the ground, and the bump does not interfere with collection.

While the device 1 was already imposing force to the ground 7 at the leading row 17 before the bump, every component communicating force to the site of contact on the ground 7 simple experienced a fluctuation in the load, without any deviation in direction. The trailing rows 19, 21 experienced only a marginal increase in force of contact with the ground 7, and following the bump, would return to merely skimming contact with the ground 7.

Referring now to FIG. 6, the tractor 2 continuing to move the device 1 in the same direction, further along the same path of collection of FIG. 5, encounters the bump in the topography 8 with its rear wheels 29.

Here, the bump of the rear wheel 29 has the effect of tipping forward both the tractor 2 and device 1 about the contact patch of the front wheel 27. In this particular embodiment, the tines 23 are specified with a range of motion and amount of preloaded deflection distance Unlike in FIG. 5, because of the preload of the leveraged, forceful, contact of the tines 23 of the leading row 17 on the ground, there is a significant amount of force which can be dissipated through relieving some of the baseline deflection of the leading row 17. that it is sufficient to maintain sufficiently forceful contact of the tines 23 with the ground 7, despite the sudden droop. Likewise, the trailing rows 19 and 21 are similarly specified, but with significantly lower, relatively negligible pre-load.

Further, while not depicted here, the present invention contemplates embodiments which are adapted to allow the tines 23 to freely-pivot a significant distance downward, away from the frame 11, upon significant deflection of the device 1 away from the ground 7, and maintain contact with the ground 7 under merely their own weight. Such an embodiment would prioritize an absolute minimum degree of forceful contact but prioritize maintaining at least a desirable particular minimum of force necessary to continuously follow the topography 8 without breaking contact with the ground 7. As the trailing rows' (19 and 21) role in collection is to primarily continue to carry forward the material 25 which is already lifted by the leading row 17, a sudden decrease in the force provided in "skimming" contact would have negligible decrease in performance to continuously carrying the material collected in such trailing rows 19, 21.

Figure 7:
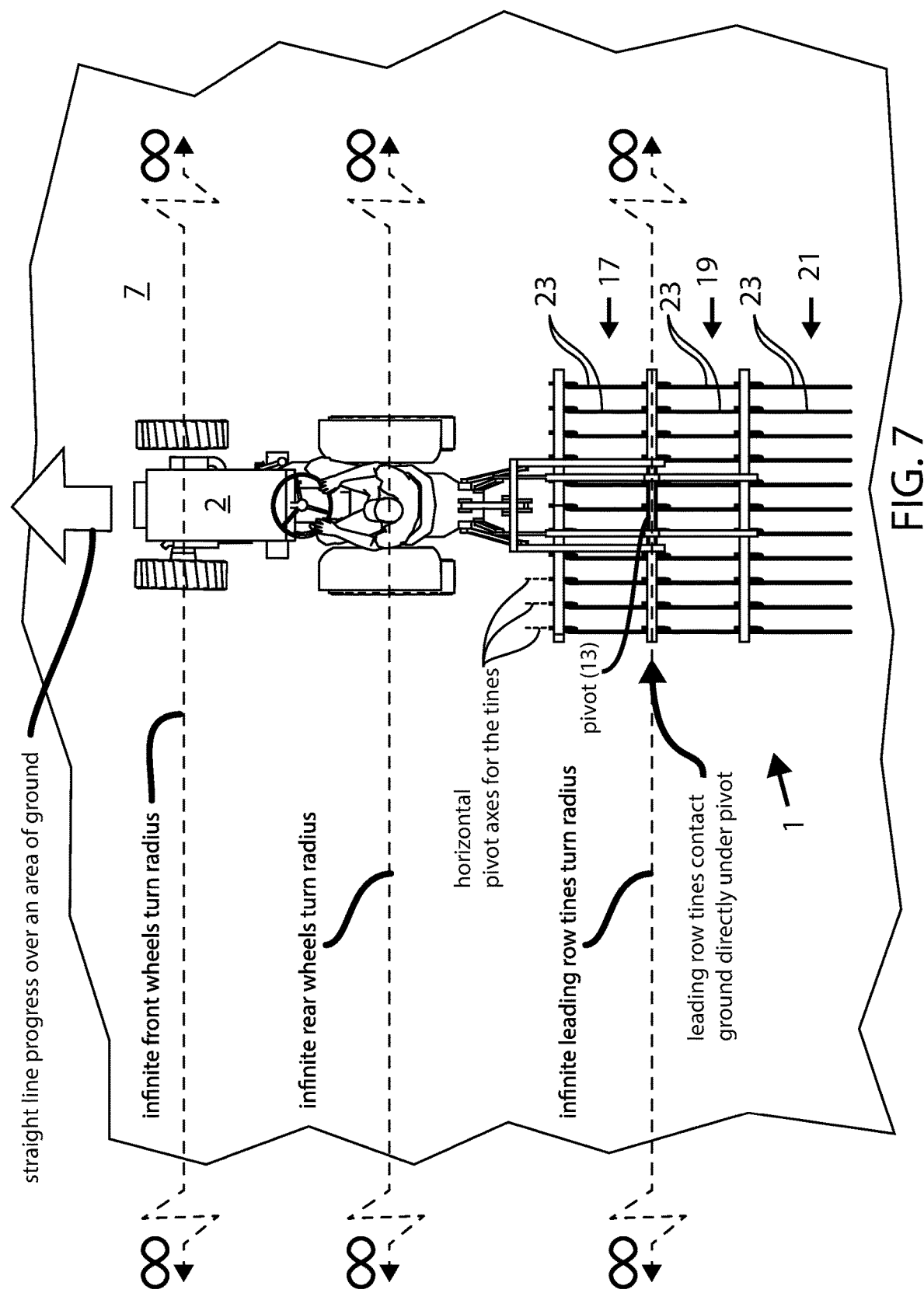
FIG. 7 is a plan view of an exemplary topography following material collection device, shown being moved over ground in a collection path in a longitudinal direction.
Figure 8:
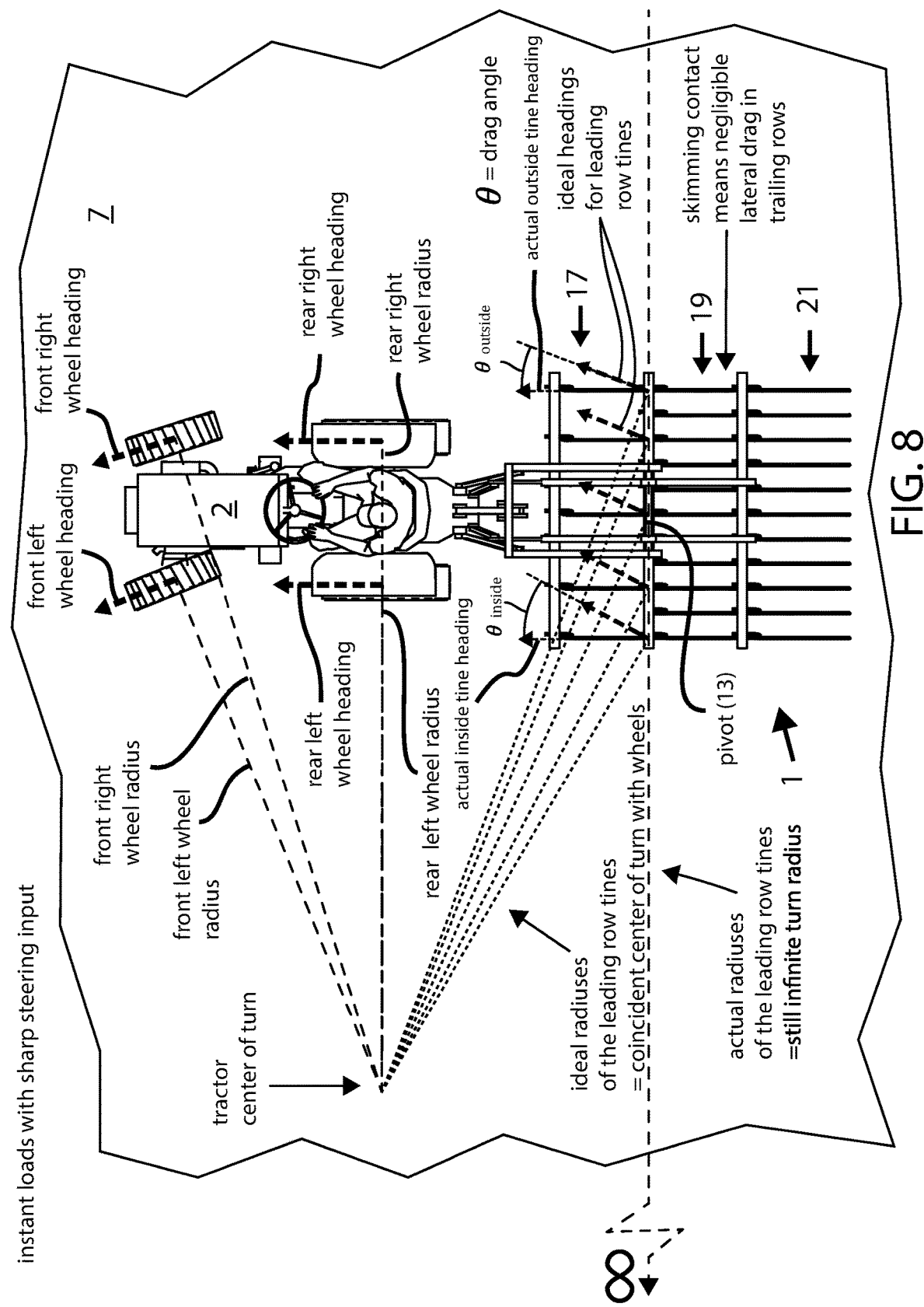
FIG. 8 is a plan view of an exemplary topography following material collection device, shown being moved over ground in a collection path at a moment of steering input.

FIGS. 7-9 show a mode of operation which isolates lateral forces from countering the lateral stability of either of the tractor 2 and device 1, so that the tractor 2 and device 1 are moved with laterally stable progress over an area of ground 7.

Note that for all of FIGS. 7-9, the relative sizes of the tractor 2 and device 1 have been displayed for the purpose of clarity in the figures. Several contemplated embodiments arrange the device 1 in various widths, including ones in which the device 1 is approximately as wide as the width of the tractor 2. Such embodiments have advantages in maneuverability on areas of ground 7 which have narrow spaces between obstructions, such as trees.

In several contemplated sub embodiments of the device 1 which are no wider than the tractor 2, and which have similar overall proportions of width to length as the device 1 shown in FIGS. 7-9, the overall outside turning radius of the combined tractor 2 and device 1 is much closer to the overall turning radius of the tractor 2, in isolation. See FIG. 9 for more on overall turning radius.

For clarity, several notes appear in these figures and are referred to, below, where helpful.

Referring now to FIG. 7, what is shown is a plan view of an exemplary embodiment of the device 1, in anticipation of a turn in a collecting path, while the tines 23 of the device 1 are in contact with the ground 7.

Here, before executing a turn, the front wheels, rear wheels, and tines 23 of the leading row 17 all have a turn radius of infinite length, because they are all moving in a straight line. These are labeled as infinite front wheels turn radius, infinite rear wheels turn radius, and infinite leading row tines turn radius.

Turning radius is a factor in determining the relative forces and angular adjustment necessary to rotate an object through a turn. Any particular angle of heading away from longitudinal progress has an associated radius of turn, and thereby, a center of turn. For an object having many points of forceful contact with a surface, the object is only able to negotiate a turn without dragging components laterally by arranging the components to move without lateral resistance, meaning arranging them to each scribe an arc having a radius with a coincident center of turn.

With an infinitely long turning radius, rolling wheels and longitudinally dragging objects in straight line progress over an area of ground 7 have no lateral component of force.

Therefore, in FIG. 7, the tractor 2 experiences no deflections laterally, and proceeds with laterally stable progress while it moves over the ground 7.

Further, even if the ground 7 were to have topography which deflected a tine 23 laterally, it would not impose a lateral force upon the device 1, and the tractor 2 would remain isolated from the lateral deflection of the tine 23, even in the event of lateral deflection of all of the tines 23. This is because all of the tines 23 in each of the rows 17, 19, 21 are retained to the device on horizontal pivot axes.

These axes ("horizontal pivot axes for the tines") are arranged in parallel with respect to the direction of longitudinal progress, such that any lateral forces imposed upon any tine 23 has the effect of only deflecting the particular tine 23 laterally, but only at the site at which the particular tine 23 makes contact with the ground.

The tines are arranged with such a significant height, with respect to the ground 7 (see FIGS. 1-6), such that even lateral deflections of several inches only offset the tine a small angle away from vertical, and this pivoting motion would be further isolated from the device 1 by the tine 23 also having significant pliancy, by both material selection and proportions, in at least one of vertical deflection, twisting deflection, bending in either of cantilever bending about the site at which the particular tine 23 depends from the device 1 and about the particular horizontal pivot axis, as to any deflection which was not fully managed by purely rotating about the particular horizontal pivot axes.

Because of the size and pliancy of the tines 23, and the minimal angular and lateral deflection which a tine 23 would experience as the result of a laterally-imposed force by a local topography feature, the quantity and proximity of the tines 23 allows the individual deflection without compromising the ability of any particular tine 23 to retain collected material 25 (not shown) for its respective row.

Note that while rows 19 and 21 do have their own respective theoretical turn radiuses, the embodiment shown in FIGS. 7-9 maintains the trailing rows 19 and 21 with only skimming contact with the ground 7, meaning that these rows (19, 21) apply only marginal force to the ground 7, and therefore are able to be moved laterally with relatively negligible or zero effect upon lateral stability, as desired. The skimming contact essentially negates the ability of these rows to negatively affect lateral stability, and therefore there is no need for the tines 23 in these rows 19 and 21 to be arranged to scribe arcs with a radius providing them a coincident center of turn.

In the event of a similar embodiment to the device 1 in FIGS. 7-9 being moved over an area of ground 7 that has topography which has the effect of increasing the degree of forceful contact with the ground 7 (see FIGS. 3-5), the trailing rows 19 and 21 would engage the ground with a similar effect upon lateral stability as that of leading row 17.

Referring now to FIG. 8, what is shown is a plan view of an exemplary embodiment of the device 1, in response to a steering input, at the initial onset of beginning a turn (which is also similar to making a small steering input) of a turn in a collecting path, while the tines 23 of the device 1 are in contact with the ground 7.

Here, the operator has applied a desired amount of steering input. The front wheels have been offset from longitudinal progress by an individually corresponding amount, such that they each have a radius of turn ("front left wheel radius" and "front right wheel radius"), which is defined by the coincident point at which a ray drawn from each wheel, perpendicular to each of the front wheels' respective heading ("front left wheel heading" and "front right wheel heading) intersects with the ray extending perpendicularly from the headings of the rear wheels ("rear left wheel heading" and "rear right wheel heading"). This is merely one exemplary geometry.

For clarity of detail described below, with respect to the leading row 17, a smaller quantity of tines 23 are shown in the leading row 17 in FIGS. 8 and 9.

As explained above, for the tines 23 of the leading row 17 to apply zero lateral force against the tractor 2, the tines 23 would each need to be angularly offset from the direction of longitudinal progress to an angle which provides each tine 23 with a radius of turn that has a center of turn which is coincident with the tractor center of turn. These radiuses are denoted collectively in FIG. 8 as "ideal radiuses of the leading row tines=coincident center of turn with wheels." The respectively correlating headings for each of the tines are labeled "ideal headings for leading row tines."

However, because the tines are not actively turned, in the manner of the front wheels 27, and are not rolling tangentially to the arc of the turn, in the manner of the front wheels 29, the tines 23 have an unchanged actual heading, relative to the direction of purely longitudinal progress. For clarity, only the actual headings of the tines 23 which are closest to the center of the turn and the furthest from the center of the turn have been labeled ("actual inside tine heading" and "actual outside tine heading"). As the actual headings of the undeflected tines 23 of the leading rows remains longitudinal at this moment, the tines still retain an infinite turn radius (labeled "actual radiuses of the leading row tines=still infinite turn radius").

The difference between the actual tine heading and the ideal tine heading is the drag angle for the respectively labeled tines ("$\theta_{inside}$" and "$\theta_{outside}$"). Without mitigation of either the contact force applied at the site of contact (for all of the tines 23 of the leading row 17) or the angle of angular offset (such that the respective drag angles for each of the tines 23 of the leading row 17), the lateral force component of the dragging force of each tine, dictated by the respective drag angles, would impose a lateral force on the device 1, and would thereby further impose a lateral force upon the tractor 2. However, the present embodiment is assembled and arranged to mitigate such forces, even without the ability to actively deflect the tines laterally.

As stated above, because the trailing rows 19 and 21 only contact the ground with merely skimming contact, they merely translate over the ground while imposing negligible force, and therefore have no effective radius of turn (labeled "skimming contact means negligible lateral drag in trailing rows), and have no effect upon lateral stability of the device 1 and tractor 2.

Referring now to FIG. 9, what is shown is a plan view of an exemplary embodiment of the present invention, as supported by a tractor 2, while negotiating a continuous turn, with several radiuses of turn for components moving through arcs about a coincident center of turn. While the device 1 and tractor 2 appear to be in a similar position to that of FIGS. 7 and 8, it should be understood to be a plan view in a similar orientation to that of FIGS. 7 and 8, but that the tractor 2 and device 1 are further along a path of collection over the same area of ground 7. The respectively rolling and dragging components have been moved through a turn, moments after that of FIG. 8.

Here, it can be seen at least one mode of operation by which the present embodiment of the device 1 mitigates any compromise in lateral stability at the tines 23 of the leading row 17. The device 1 provides both the ability of the tines 23 to pivot about the horizontal pivot axes (See FIG. 7), as well as several degrees of freedom (by height, length, material, and quantity) in pliancy, as mentioned above.

The tines 23 of the leading row 17 are deflected laterally, about their respective horizontal pivot axes. The lateral deflection has the effect of allowing each tine 23 to maintain continuous contact with the ground by allowing the respective actual sites of contact for the tines to trail the point at which each of the tines are retained to the device 1. Thereby, each tine is passively afforded a heading that is approximately parallel to the corresponding ideal radiuses of turn (See FIG. 8). Because of the proportions and pliancy of the tines 23, and range of lateral deflectability about the horizontal pivot axes, the sites of contact with the ground 7 for all of the tines 23 of the leading row remain approximately under the pivot (13, FIGS. 7, 8), even though theses tines 23 are laterally deflected.

Note that the tines 23, by their pliancy and ability to pivot, are able to alternately or in combination deflect internally with respect to themselves or with respect to the horizontal pivot axes as desired in preferred settings of a user or rider or operator of the tractor 2, or as desired during assembly of the specific embodiment and in selection of a desired specification for particular tines 23. This includes embodiments which may provide multiple rows of tines which contact the ground 7 with leveraged contact, similar to the tines 23 of the leading row 17 shown in FIGS. 7-9.

Specifically to FIG. 9, though, a note appears about an embodiment which affords a maximum amount of lateral deflection. In such case, the distance of lateral deflection of the tines 23 of the leading row would deflect so far as to allow even a degree of contact similar to that of the trailing rows 19, 21, by the angular offset effecting a decrease in compression of the tines 23, such that the degree of forceful contact being reduced to similar levels as the merely skimming contact of the trailing rows 19 and 21. However, in no case would contact be lost, and therefore any material collected in the leading row 17 would not be lost during the turn. The note reads, "Leading row tines have no center of turn, because pivoting about the pivot axis reduces the degree of forceful contact with the ground while pivoted away from a straight-line heading."

What is claimed is:
1. A device for a tractor, comprising:
a topography following system,
a material collecting system, and
a plurality of ground contacting implements,
and specifically comprising:
a chassis, a plurality of chassis-supporting links, a frame, a plurality of frame-orienting links, and a plurality of rows of material collection tines,
each link of the chassis-supporting links and the frame-orienting links being an elongate member defined by a first and second end and angularly articulable about a first object at the first end and angularly articulable about a second object at the second end,
wherein;
the first object for the chassis-supporting links is the tractor, and the second-object for the chassis-supporting links is the chassis,
the first object for the frame-supporting links is the tractor, and the second-object for the frame-supporting links is the frame,
the frame is angularly articulable about a pivot on the chassis and supported therefrom, the rows of material collection tines are supported along the frame, arranged in sequential material collecting stages with respect to a longitudinal direction, the tines of each row being pivotably articulable about longitudinally-extending horizontal pivot axes that are spaced apart at intervals from one another in the lateral direction, with respect to one another, within their respective stages, and the device having a cumulative weight, such that the device is configured to have its cumulative weight fully supportable by the tractor and is configured to be actively adjusted through a range of heights with respect to the ground with the chassis-supporting links and range of orientation with respect to the topography of the ground that comprise a height and orientation at which there is complete separation of the tines from the ground and a height and orientation at which the tines of at a least one row are in leveraged contact with the ground, while the tractor is being driven over at least one of undulating or uneven topography, and such that when the tractor is moved over the ground, the dive is configured to maintain leveraged contact with at least a leading row of tines and follow the topography of the ground with laterally stable progress, leveraged contact meaning forceful contact is applied as a normal force to the topography of the ground, such that the direction of the force is aligned with the direction of a line drawn between the location of contact and a vertical location of the pivot on the chassis, laterally stable progress meaning that the tines are configured to maintain their degree of contact that is not compromised by lateral forces or travel with respect to the ground and to also isolate lateral forces or travel with respect to the ground from the tractor.

2. The device of claim 1, wherein the stages follow the ground successively and pivotably align the collection system with the ground with passive deflection of the topography following system.

3. The device of claim 2, wherein the device is supported by the tractor moving over the ground and passive deflection of the topography following system comprises vertical deflections of the tractor by the topography.

4. The device of claim 1, wherein the stages follow the ground in successively and pivotably align the collection system with the ground with active deflection of the topography following system.

5. The device of claim 1, wherein the tines of the leading row of tines comprise a positive angle of attack, with respect to the ground.

6. The device of claim 1, wherein the collection system is arranged to provide anti-scatter geometry.

7. The device of claim 1, wherein the ground contacting implements comprise the leading row of tines and at least one trailing implements, wherein the leading row of tines is configured to impose a force at each tine that is normal to the topography of the ground and maintain for each of the tines at least one of a positive angle of attack at each particular location of the tine making forceful contact with the topography of the ground and a profile shape above and trailing the particular location of forceful contact, such that the leading row of tines is configured to collect up to a stage collection capacity of material that is at least one of retained and tumbled with respect to the ground by the leading row of tines as the device is moved over the ground, and the at least one trailing implement is configured to follow the leading row of tines and collect material collected from the ground by the leading row of tines but which exceeded the stage collection capacity of the leading row of tines.

8. The device of claim 1, the device further comprising at least one trailing implement that is a row of tines in non-leveraged contact with respect to the ground and has a trailing row stage collection capacity and continuously collects material which was collected from the ground by the leading row of tines.

9. The device of claim 8, wherein the at least one trailing implement is configured to continuously collect material after the reaching of the stage collection capacity for the leading row of tines by delivering collected material to a trailing row of tines after at least one of the leading and at least one trailing row of tines particular stage reaches the respective stage capacity for the particular stage that is at least one of retained and tumbled with respect to the ground by particular row of tines as the device is moved over the ground.

10. The device of claim 1, wherein the device is adapted to laterally stable progress over the ground by all of the ground contacting implements being pivotable in the lateral direction with respect to one of a type of contact selected from; leveraged and non-leveraged contact and skimming contact with the ground, with respect to the device being moved over the ground.

11. The device of claim 10, wherein the ground contacting implements are pivotable laterally by being pivotable about an axis which is maintained parallel to the ground as the device is moved over the topography of the ground, and parallel to the direction of movement, as the device is changing direction as it is driven over the ground.

12. The device of claim 11, wherein the device is adapted to lateral stability by the device being moved over the ground by the tractor having a tractor width, and each of the stages having a stage width, wherein the stage widths are no greater than approximately the tractor width, and are all implements that are one of: implements in leveraged-contact with the ground and maintain contact with the ground at the locations of leveraged contact while the tractor is driven over ground and as the device is changing direction and implements in one of non-leveraged and skimming contact with the ground and are configured to translate laterally relative to the topography of the ground as the device is changing direction and not impose a force on the device and the tractor.

* * * * *